Jan. 22, 1924.

E. A. B. BUTTERFIELD

TRAP NEST

Filed June 9, 1922      3 Sheets-Sheet 1

1,481,684

E. A. B. Butterfield,
INVENTOR

BY Victor J. Evans
ATTORNEY

Jan. 22, 1924.
E. A. B. BUTTERFIELD
TRAP NEST
Filed June 9, 1922      3 Sheets-Sheet 2
1,481,684
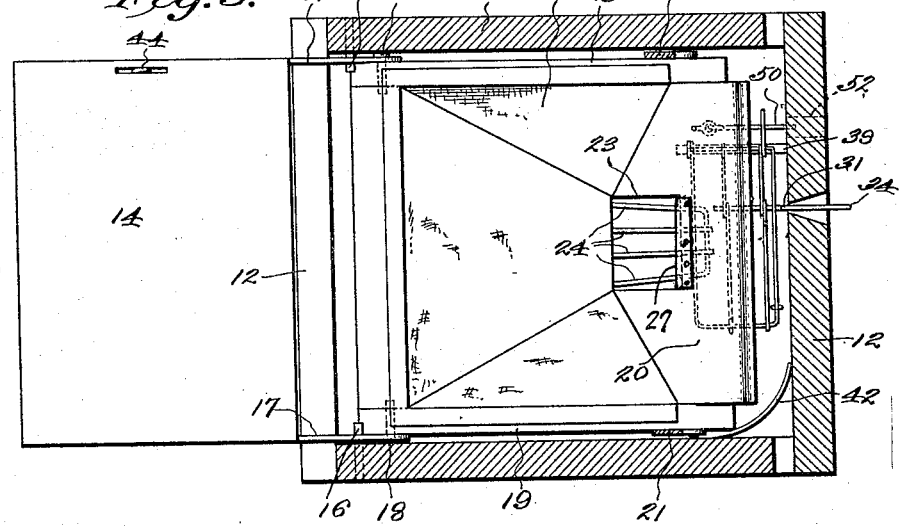
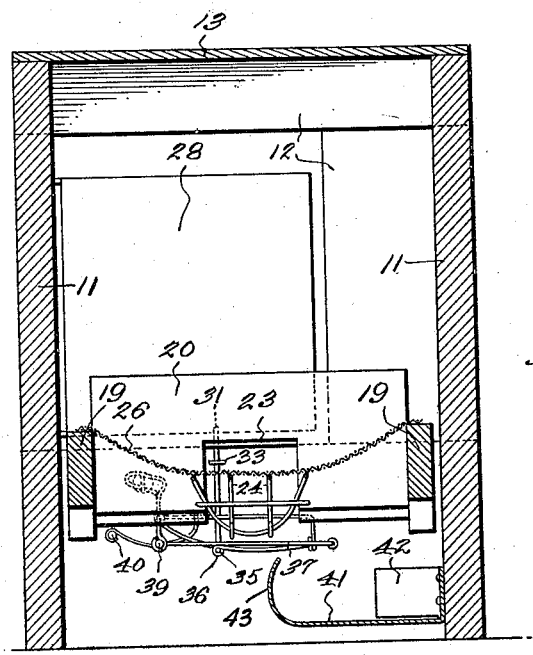
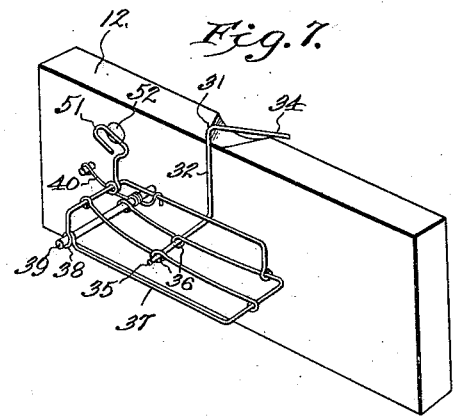
E. A. B. Butterfield,
INVENTOR
BY Victor J. Evans
ATTORNEY
WITNESSES Jan. 22, 1924.
E. A. B. BUTTERFIELD
1,481,684
TRAP NEST
Filed June 9, 1922   3 Sheets-Sheet 3
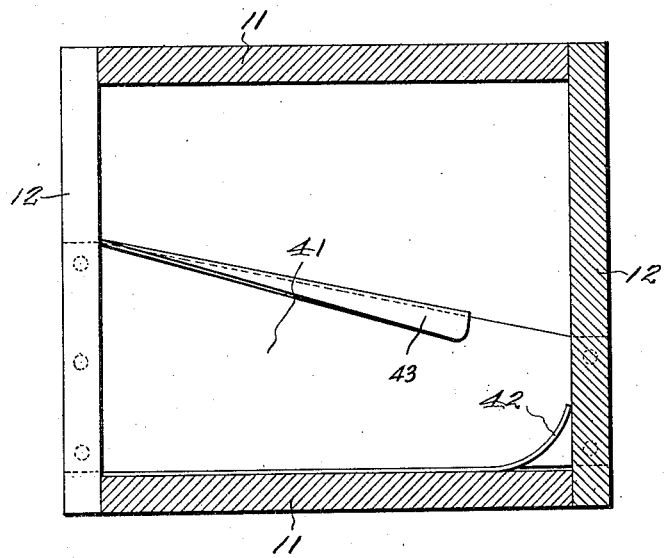
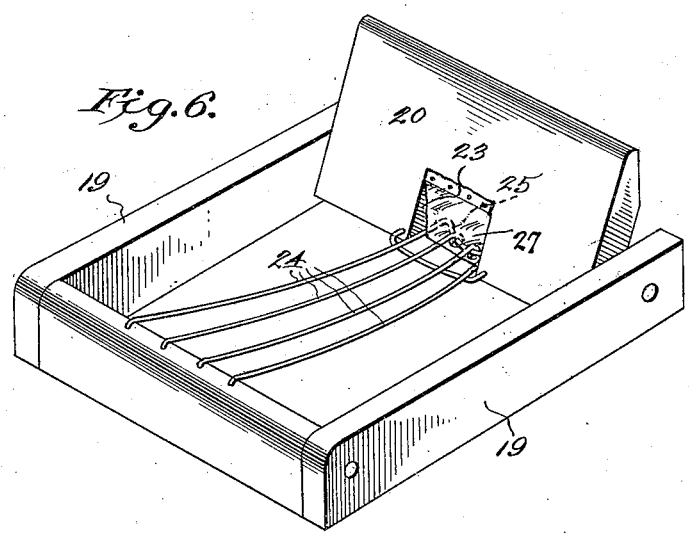
E.A.B.Butterfield,
INVENTOR
BY Victor J. Evans
ATTORNEY
WITNESSES Patented Jan. 22, 1924.

1,481,684

UNITED STATES PATENT OFFICE.

EDWIN ALFRED BURR BUTTERFIELD, OF MOLALLA, OREGON.

TRAP NEST.

Application filed June 9, 1922. Serial No. 567,130.

*To all whom it may concern:*

Be it known that I, EDWIN A. B. BUTTERFIELD, a citizen of the United States, residing at Molalla, in the county of Clackamas and State of Oregon, have invented new and useful Improvements in Trap Nests, of which the following is a specification.

This invention relates to improvements in trap nests.

An object of the present invention is the provision of a trap nest which will permit of the entrance of a hen therein and will automatically trap said hen within the nest, means being provided whereby the weight of an egg will operate to release the hen so as to permit her to leave after an egg has been laid.

Another object of the invention is the provision of means for automatically resetting the operating mechanism after the hen leaves the nest, so that the latter will be ready to receive another hen.

Another object of the invention is the provision of a safety device, whereby entrance to the nest will be prevented in the event of failure of the parts to properly operate, so that before the nest may be again used, the parts must be manually rearranged to insure their proper operation.

With the above and other objects in view, the invention further includes the following novel features and details of construction, to be hereinafter more fully described, illustrated in the accompanying drawings and pointed out in the appended claims.

In the drawings:—

Figure 3 is a horizontal section taken on a plane above the nest and showing the exit door open.

Figure 4 is a vertical transverse section.

Figure 5 is a horizontal sectional view taken on a plane below the nest.

Figure 6 is a detail perspective view of the nest with the lining removed.

Figure 7 is a similar view of the latch and trap.

Figure 1:
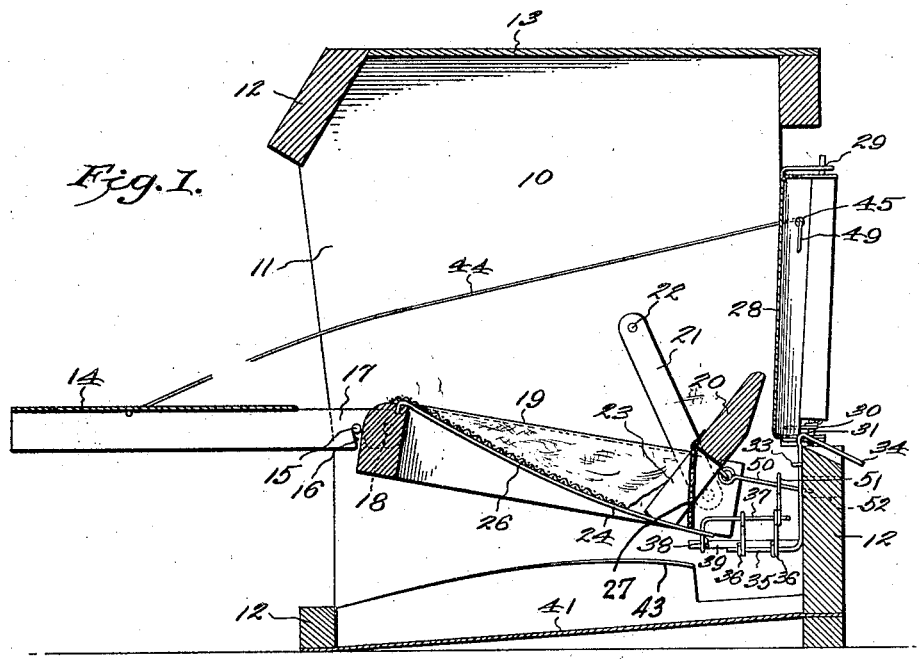
Figure 1 is a vertical longitudinal sectional view showing the entrance door open.
Figure 2:
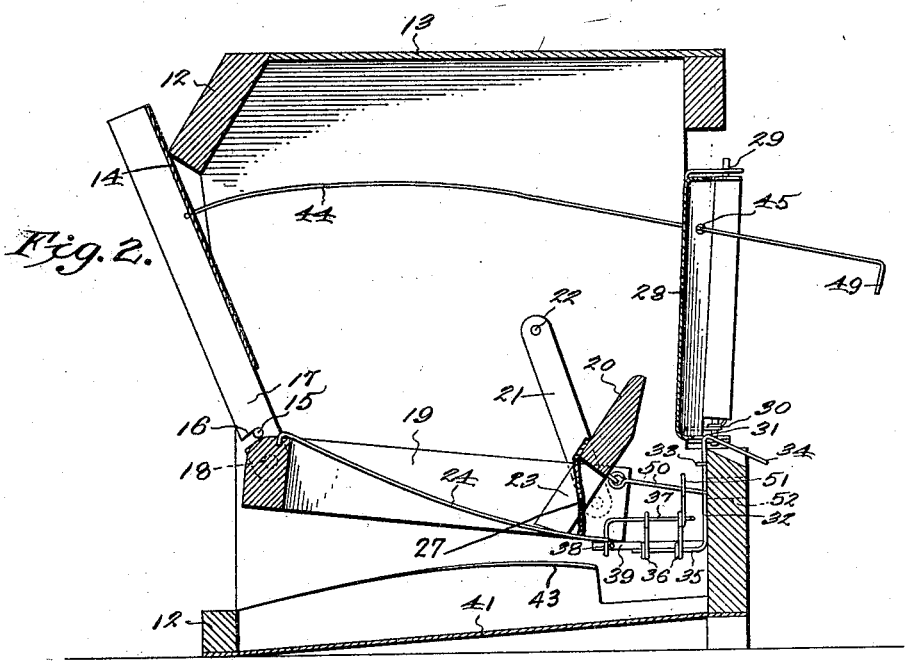
Figure 2 is a similar view with the door closed.

Referring in detail to the drawings, wherein like characters of reference denote corresponding parts, the reference character 10 indicates a casing or housing which is made up of side walls 11, end walls 12 and a top 13, the bottom of the housing being open.

One end of the housing is provided with an entrance door 14 which is pivotally mounted upon trunnions 15 extending inwardly from the side walls 11, the said trunnions engaging over notches 16 provided at the inner ends of side bars 17, the latter being secured along opposite side edges of the entrance door 14 and extending downwardly below the bottom of the door.

The lower extremities of the side bars 17 are pivotally connected as shown at 18 to one end of a nest 19 and act to support this end of the nest. The nest is formed of a frame which includes an inclined end bar 20 whose upper edge extends above the upper edge of the sides of the nest. The end bar 20 and the sides of the nest are slightly spaced from the end and side walls of the housing 10 so as to permit of free operation or pivotal movement of the nest. The rear end of the nest is supported upon links 21, whose lower ends are pivotally connected to the sides of the nest and whose upper ends are pivotally connected to the side walls 11 of the casing as shown at 22, the pivotal connection 22 being to one side of the vertical plane of the connection of the opposite ends of the links with the nest, so that the latter will be normally urged to swing in a direction toward the front of the housing 10.

The rear inclined bar 20 is provided intermediate its ends with an opening 23 and extending through this opening are substantially horizontally arranged supporting wires 24. The inner ends of these wires are connected to the entrance end of the nest and are disposed in substantially fan-like formation, while the opposite ends of the wires extend through the opening 23 in the end bar 20 and are disposed in a plane below the other ends of the bars so as to incline downwardly and rearwardly. The lower ends of the wires or bars 24 are connected together as shown at 25. Secured within the frame of the nest 19 is a lining 26 which is preferably formed of heavy fabric and inclines or slopes toward the center and rear end of the nest and is supported upon the wires 24, so that the lowest point of this lining is at the opening 23. A curtain 27 partly closes this opening.

The rear end of the housing 24 is provided with an exit door 28 which is hingedly secured to the housing 10 as shown at 29, the arrangement of the hinge being such that the top of the door will be inclined outwardly in a manner to cause said door to swing to an open position. A light spring 30 also acts to urge the door 28 to an open position.

The door 28 is normally held closed by means of a latch 31 which is formed of a vertically movable elongated rod 32 which is guided in an eye 33 secured to the rear end 12 of the housing. The upper end of the rod or latch 32 engages the rear face of the door and when so engaged will hold the latter in closed position. The latch is provided with an inclined extension 34 with which the lower end of the door is adapted to engage to force the latch downward and permit the door to close. The lower end of the latch is provided with a right angular extenson 35 which engages spaced eyes 36 formed in the bottom of a frame 37. This frame 37 is formed of spaced parallel rods or wires, at one end of which is provided spaced eyes 38 for the reception of a pivot pin or rod 39, the latter being carried by the rear end 12 of the housing 10. The opposite end of the frame 37 is inclined downwardly and provides a chute. Being positioned at the lower end of the extended bottom of the nest, this chute will receive an egg from the nest and the weight of this egg will act to further depress the lower end of the chute to permit the egg to roll downward and trip the latch 31, the parts being returned to their normal position after being relieved of the weight of the egg, by means of a spring 40.

When the egg leaves the chute or trip, it enters a pan 41 and this pan is inclined downwardly and forwardly so that the egg will roll toward the front end of the housing 10. To further insure a forward rolling movement of the egg, the pan 41 is provided at its receiving end with an inwardly curved guide 42 so that the egg will be deflected in a direction toward the front end of the housing. The pan 41 is provided with a protecting flange 43 to prevent the falling of dirt or other extraneous matter from the nest into the pan.

In the operation of the invention, the front or entrance door 14 of the nest is normally open and when a hen enters the nest, the weight of the said hen will depress the nest and cause the front door to move upwardly to a closed position, this closed position being inclined slightly outward to insure proper opening of the door when the weight of the hen is relieved from the nest. The hen will thus be trapped within the nest and as soon as she lays an egg, the latter will roll outward through the opening 23 on to the frame or trip 37. The weight of the egg will depress the frame or trip in the manner previously described and will move the latch 31 downward to release the exit door 28, whereupon the latter will open through the combined action of gravity and the spring 30. When the exit door 28 is opened, the hen may then leave the nest and when relieved of her weight, the nest will rise so as to permit the entrance door 14 to open.

Connecting the entrance door 14 and the exit door 28 is a rod 44 having one end pivoted to the door 14 and the opposite end extending through an opening 45 in the door 28 and provided with a stop 49. The rod 44 may thus move rearwardly through the opening 45 when the nest door is closed, but when the said entrance door opens, the stop 49 will engage the door 28 and close the latter, the closing action depressing the latch 31, so that the door may be engaged by said latch and held in closed position. The nest will then be ready to receive another hen.

In the event of the latch 31 failing to operate at the closing of the door 28, means is provided for preventing the entrance door 14 from opening. This consists of a rod 50 which has one end connected to the rear bar 20 of the nest and its opposite end extending through a guide eye 51 carried by the frame or trip 37, the said guide eye 51 being elongated and disposed at an incline. Normally, the inner end of the rod 50 is arranged for passage through an opening 52 provided in the rear wall 12 of the housing 10, but when the frame or trip 37 is depressed, the rod 50 will be carried to one side of the opening 52 and will be held in such position until the frame 37 is raised. Thus, should the frame fail to move upward and carry with it the latch 31 to engage the door 28 and hold the latter in a closed position, the door 14 could not open, as the nest 19 could not swing rearwardly due to the engagement of the end of the rod 50 with the rear end of the housing. It will be readily apparent to an attendant that the nest was not in proper working condition and the parts could be readily arranged to insure proper operation.

The invention is susceptible of various changes in its form, proportions and minor details of construction and the right is herein reserved to make such changes as properly fall within the scope of the appended claims.

Having described the invention what is claimed is:—

1. A trap nest comprising a housing, a pivotally mounted normally open entrance door, a normally closed exit door, a nest movable within the housing and having one end pivotally connected to one end of the entrance door, whereby the latter will be closed when the nest is occupied by a hen, a latch for holding the exit door in closed position, means operated by the weight of an egg for actuating the latch to release the exit door, and a rod having one end connected to the entrance door and its opposite end slidingly engaging the exit door, whereby the exit door will be closed by the opening of the entrance door.

2. A trap nest comprising a housing, a normally open entrance door, a normally closed exit door, a nest movable within the housing, means pivotally connecting one end of the nest with the entrance door, links having their lower ends pivotally connected to the opposite end of the nest and their upper ends pivotally secured to the housing to one side of the vertical center of the lower ends, whereby the entrance door will be closed when the nest is occupied by a hen, a latch for holding the exit door in closed position, means operated by the weight of an egg for actuating the latch to release the exit door, means whereby the entrance door will be automatically opened when the nest is relieved of the weight of the hen and means whereby the exit door will be closed by the opening of the entrance door.

3. A trap nest comprising a housing, a normally open entrance door, a normally closed exit door, a nest movable within the housing and controlling the entrance door, whereby the latter will be closed when the nest is occupied by a hen, a latch for holding the exit door in closed position, a trip operated by the weight of an egg for actuating the latch to release the exit door, means whereby the entrance door may be automatically opened when the nest is relieved of the weight of the hen, means whereby the exit door will be closed by the opening of the entrance door and means whereby the position of the trip will regulate the opening of the entrance door.

In testimony whereof I affix my signature.

EDWIN ALFRED BURR BUTTERFIELD.